UNITED STATES PATENT OFFICE.

CHARLES H. SEAMAN, OF MILWAUKEE, WISCONSIN, ASSIGNOR TO OTTO H. FOERSTER, OF MILWAUKEE, WISCONSIN.

COMPOSITION FOR REFRIGERATOR-LININGS, &c.

1,144,615.   Specification of Letters Patent.   Patented June 29, 1915.

No Drawing.   Application filed March 4, 1912.   Serial No. 681,620.

*To all whom it may concern:*

Be it known that I, CHARLES H. SEAMAN, a citizen of the United States, residing at Milwaukee, in the county of Milwaukee and State of Wisconsin, have invented a certain new and useful Improvement in Composition for Refrigerator-Linings, &c., of which the following is a full, clear, concise, and exact description.

My invention relates to a new composition of matter which is of particular use for refrigerator linings although the same may be otherwise very satisfactorily employed.

In constructing the material I mix certain ingredients to form a hard, strong substance which may be cast and otherwise worked into forms desired for commercial purposes. In the description herein I will confine myself particularly to the application of my invention to such articles as refrigerator linings, although as before stated my invention is not so limited in its scope.

It is a prime object of my invention to provide a material for shaped bodies, such as refrigerator linings, which may be formed into hollow rectangular box-like structures having either one or two of the ordinary six sides omitted, which box-like structure may be then inserted within ordinary refrigerators as the lining thereof, and which may serve at the same time as the heat insulating medium necessary for proper refrigeration. These box-like structures may have a size of the rectangular sides, possibly from one to three feet square and it is necessary to have a strong material. The thickness may be all the way from a quarter of an inch to an inch, although the particular size has nothing to do with the invention, the dimensions herein given being merely to illustrate the purposes for which this composition of matter may be peculiarly available.

It is a prime object of my invention to provide a material which when completed may be white, or very nearly white so that it does not require painting or enameling or any other attention in order to change its inherent color. Likewise it is a prime object of my invention to provide a material peculiarly susceptible to a novel treatment as set forth in Patent No. 1,085,227, issued Jan. 27, 1914, whereby this material is made impervious to attack by the various articles that may be found in a refrigerator so that blood stains and other stains may be readily removed merely by washing, the material itself not absorbing the constituents of the stain so that the material may remain white as is necessary for a proper commercial article.

I find that the material whose constituents will be given below has a sufficient hardness to insure lasting qualities and durability and also has the necessary whiteness requisite for linings of this particular character and other uses as may be found or already in contemplation.

In a typical embodiment of the invention, I first prepare a mixture or base of the following ingredients:

Powdered calcined magnesite _____ 33⅓%
Powdered glass _____ 16⅓%
Powdered quartz _____ 16⅓%
Marble dust _____ 16⅓%
Feldspar _____ 14⅓%
Light calcined magnesia _____ 3⅓%
                                    ─────
                                    100 %

Instead of using feldspar I may even have a whiter substance if I use marble flour. The above mixture is then suitably mixed with sufficient magnesium chlorid solution of 22 5/10 Baumé density to form a thick cream. When these materials are mixed considerable heat is given off indicating chemical action between the various constituents. The reaction involved is a more or less complex one between the magnesium chlorid and the magnesium oxid of the mix, yielding insoluble magnesium oxychlorid. The other materials or mineral matter of the mix, such as the siliceous and calcareous constituents, may be considered as wholly, or mainly, inert fillers intimately cemented together by the oxychlorid precipitated *in situ*.

If necessary, a small quantity of bluing, such as cobalt blue, may be added to the mixture to give the finished product the desired tone or shade. With proper proportions and mixing of the constituents, the mixture should be of a creamy consistency, in which condition it may be readily cast into relatively thin sheets or plates. These are practically white in color and are well suited for refrigerator linings. The surfaces of the objects cast from the mixture in the fluent or substantially semi-liquid condition described, do not have to be polished or otherwise treated to develop a surface of the necessary smoothness. The surface formed simply in the setting of the material is substantially glazed or enamel-white in character. The material also has the necessary strength and rigidity and lends itself readily to treatment to render the same impervious to attack of substances normally placed in the refrigerator.

The solid raw materials of the mix being in finely powdered form, and the insoluble magnesium oxychlorid resulting from the addition of the magnesium chlorid being also in an extremely finely divided condition, the final product is a substantially white artificial stone of uniformly fine grain and homogeneity of composition. Substantial freedom from soluble constituents is also an advantageous characteristic of the dense stone-like product thus obtained, particularly where it is used in refrigerator linings or in other locations involving exposure to moisture.

Naturally the constituents may be varied to some extent for the particular purposes set forth, or equivalents used and still obtain the same result.

Having, however, thus described one particular manner of carrying out my invention, what I claim as new and desire to secure by Letters Patent is:

As a new article of manufacture, a shaped body set from a semi-fluent mass resulting from the admixture of magnesium chlorid solution with a finely powdered composition comprising approximately $33\frac{1}{3}\%$ calcined magnesite, $16\frac{1}{3}\%$ glass, $16\frac{1}{3}\%$ quartz, $16\frac{1}{3}\%$ marble dust, $14\frac{1}{3}\%$ feldspar, and $3\frac{1}{3}\%$ light calcined magnesia.

In witness whereof, I hereunto subscribe my name this 23 day of February, A. D. 1912.

CHARLES H. SEAMAN.

Witnesses:
EDNA KLABUNDE,
W. H. MCREYNOLDS.